United States Patent [19]
Kiel et al.

[11] Patent Number: 5,343,557
[45] Date of Patent: Aug. 30, 1994

[54] WORKSTATION CONTROLLER WITH FULL SCREEN WRITE MODE AND PARTIAL SCREEN WRITE MODE

[75] Inventors: Harvey G. Kiel; Ricky M. Peterson; Lawrence D. Whitley, all of Rochester, Minn.

[73] Assignee: International Business Machines Corporation, Armonk, N.Y.

[21] Appl. No.: 391,693

[22] Filed: Aug. 10, 1989

Related U.S. Application Data

[63] Continuation of Ser. No. 103,136, Sep. 28, 1987, abandoned.

[51] Int. Cl.⁵ ............................................. G06F 15/00
[52] U.S. Cl. ................................................... 395/118
[58] Field of Search .................. 364/518, 521, 522; 340/750, 747, 724, 798, 799; 382/46, 47, 56; 395/118, 114, 153; 345/118, 119

[56] References Cited

U.S. PATENT DOCUMENTS

| | | | |
|---|---|---|---|
| 3,428,851 | 2/1969 | Greenblum | 315/19 |
| 3,644,935 | 2/1972 | Lourie | 444/1 |
| 4,121,283 | 10/1978 | Walker | 364/200 |
| 4,204,206 | 5/1980 | Bakula et al. | 340/721 |
| 4,258,361 | 3/1981 | Hydes et al. | 340/721 |
| 4,278,973 | 7/1981 | Hughes et al. | 340/721 |
| 4,328,557 | 5/1982 | Gastinel | 364/900 |
| 4,371,871 | 2/1983 | Adams | 340/721 |
| 4,445,115 | 4/1984 | Rudgard | 340/745 |
| 4,485,378 | 11/1984 | Matsui et al. | 340/750 |
| 4,511,962 | 4/1985 | Machida et al. | 364/200 |
| 4,525,804 | 6/1985 | Mosier et al. | 364/900 |
| 4,533,910 | 8/1985 | Sukonick et al. | 340/721 |
| 4,559,533 | 12/1985 | Bass et al. | 340/724 |
| 4,642,789 | 2/1987 | Lavelle | 364/900 |
| 4,646,261 | 2/1987 | Ng | 364/900 |
| 4,653,020 | 3/1987 | Cheselka et al. | 364/900 |
| 4,749,990 | 6/1988 | Birkner | 340/799 |
| 4,786,967 | 11/1988 | Smith, III et al. | 358/143 |
| 4,833,625 | 5/1989 | Fisher et al. | 364/518 |
| 4,858,152 | 8/1989 | Estes | 364/550 |
| 4,935,880 | 6/1990 | Kelleher et al. | 364/522 |
| 4,935,881 | 6/1990 | Lowenson et al. | 364/550 |
| 4,937,565 | 6/1990 | Suwannukul | 340/735 |
| 4,954,818 | 9/1990 | Nakane et al. | 340/721 |

OTHER PUBLICATIONS

Hunt et al, Updating the Screen of a Word Processing Terminal Which Is Emulating a Data Processing Terminal, IBM Technical Disclosure Bulletin, vol. 25, No. 12, May 1983, pp. 6476–6477.

Motola et al, Communicating Word Processors Workstation Screen Updating IBM Technical Disclosure Bulletin, vol. 26, No. 3B, Aug. 1983, p. 1395.

Raster CRT Controller to Drive a Plasma Panel, IBM Technical Disclosure Bulletin, vol. 29, No. 4, Sep. 1986, pp. 1609–1610.

*Primary Examiner*—Phu K. Nguyen
*Attorney, Agent, or Firm*—Joseph P. Abate; Andrew J. Dillon

[57] ABSTRACT

A workstation controller is disclosed which operates in either full screen write mode or partial screen write mode. In one embodiment, the controller looks for a "Clear Display"(CD) command in the data stream from the host. If the data stream contains a CD command and if a screen image buffer is available, the controller operates in full screen write mode. Subsequent "Write to Device" (WTD) commands in the data stream are sent to the buffer, not to the device. When the controller detects the end of the data stream the entire contents of the buffer are sent to the display in one operation. If the controller does not detect a CD command in the data stream, or if the CD command is detected but a screen image buffer is not available, the controller operates in partial screen write mode. WTD commands in the data stream are sent directly to the display one at a time.

20 Claims, 7 Drawing Sheets

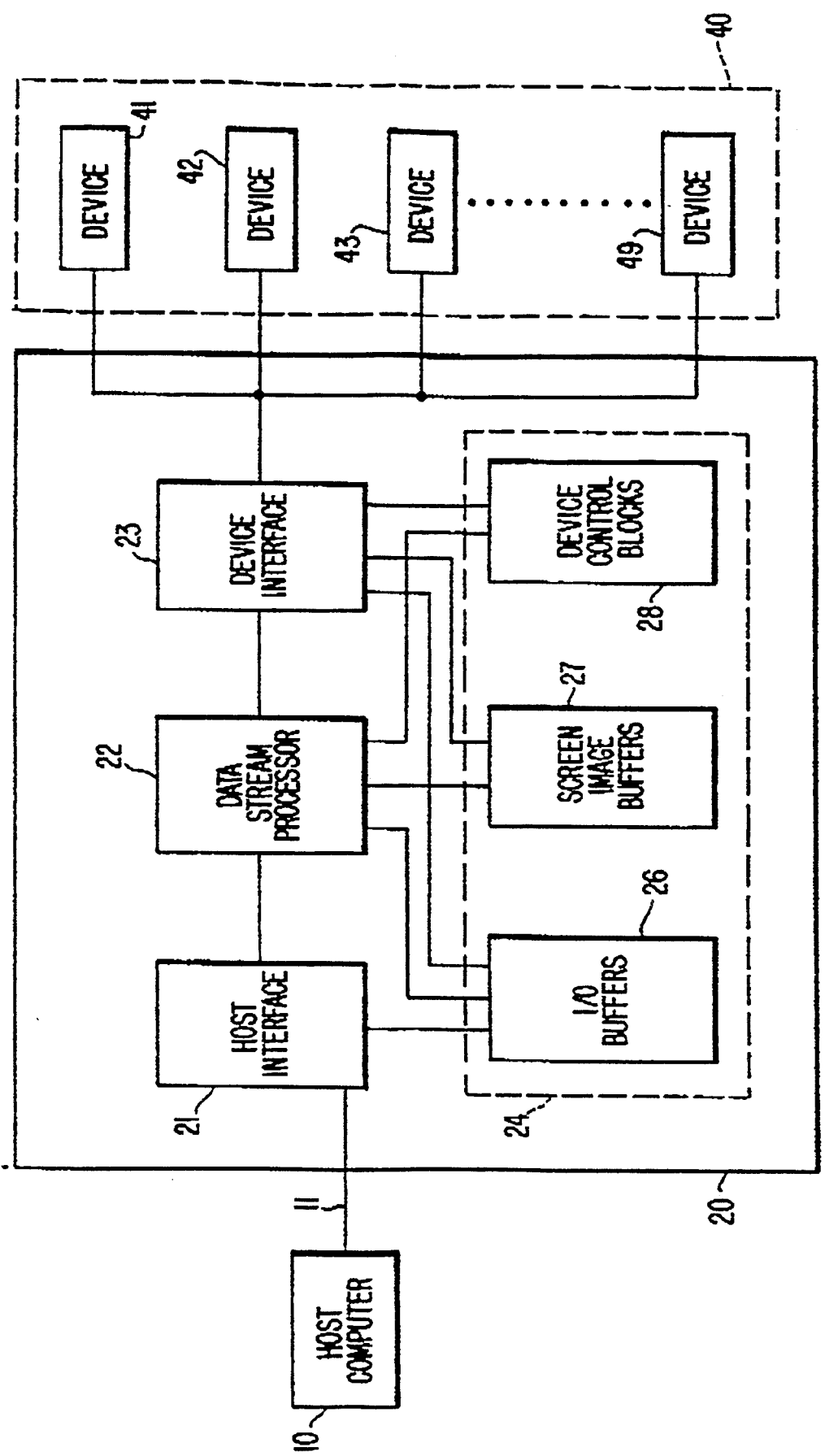

FIG. 2A.

| HEADER | DEVICE ADDRESS | CO | WTD | WTD | ... | WTD |

FIG. 2B.

| HEADER | DEVICE ADDRESS | WTD | WTD | WTD |

FIG. 2C.

| HEADER | DEVICE ADDRESS | WTD | WTD | WTD | WTD | ... | WTD |

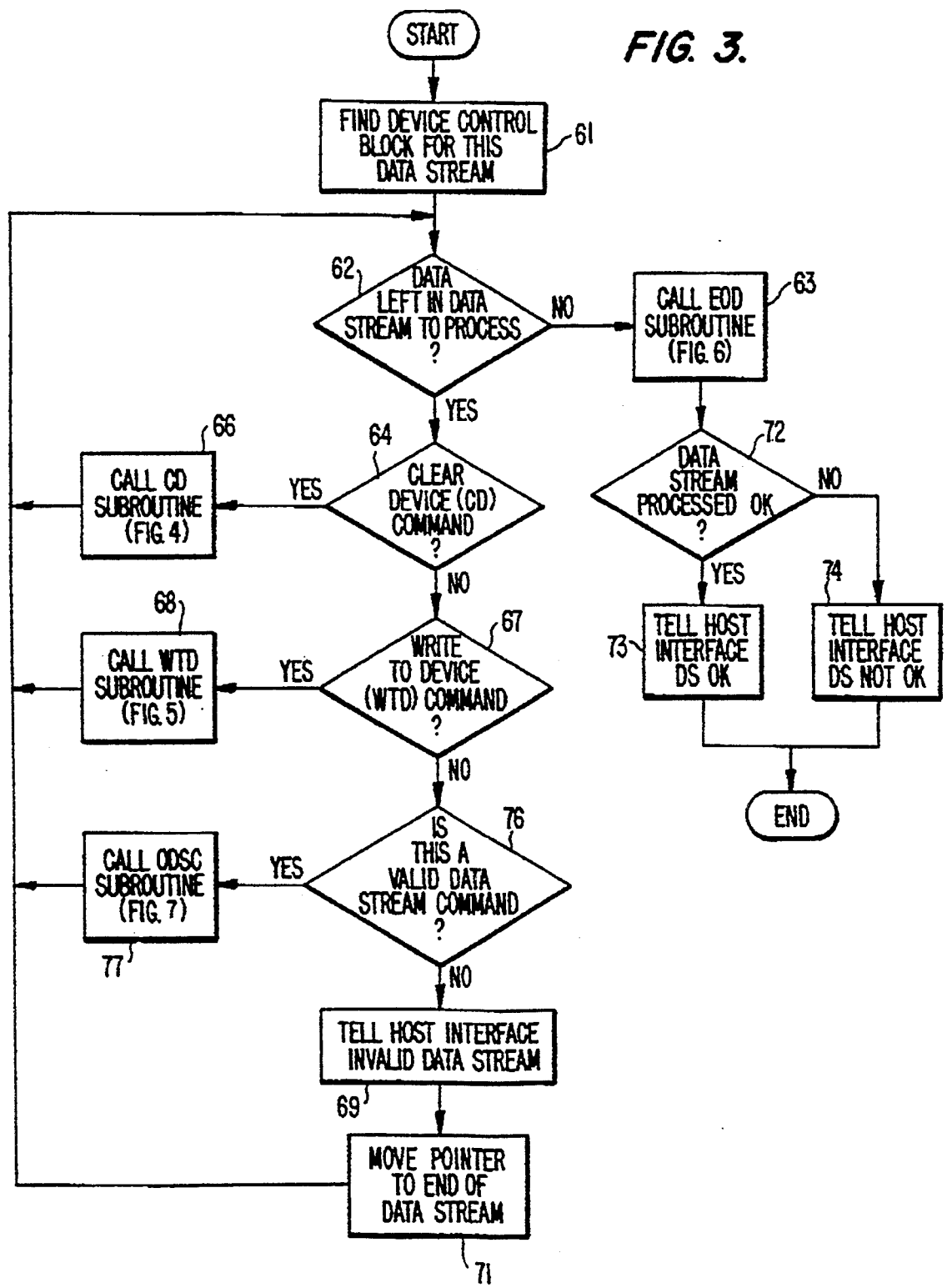

WORKSTATION CONTROLLER WITH FULL SCREEN WRITE MODE AND PARTIAL SCREEN WRITE MODE

This is a continuation of application Ser. No. 103,136, filed Sep. 28, 1987, now abandoned.

FIELD OF THE INVENTION

This invention relates to the data processing field. More particularly, this invention is a workstation controller that processes data streams efficiently by operating in full screen write mode and partial screen write mode.

BACKGROUND OF THE INVENTION

A workstation controller handles the I/O operations between a host computer and a plurality of I/O devices (displays, printers, plotters, etc). Typically, if the host wanted to send data to a device, the host would send a data stream to the workstation controller. The controller figures out which device the data is intended for, processes the data stream, and sends the data to the device.

Often the device the host wants to send data to is a display. Sometimes, the host wants to send an entire screen of data to the display. But other times, the host only wants to update a small portion of the screen.

Modern day workstation controllers do not differentiate between sending a large amount of data to a device and sending a small amount of data to a device. A first group of controllers always sends a full screen of data to a display, even if the host only wanted to update a small portion of the screen. These controllers must read the screen prior to the write operation or store complete copies of the screens of each display. Although this method is efficient if the host wanted to send a full screen of data, it is inefficient if the host only wanted to send a partial screen of data.

A second group of controllers always sends multiple partial screens of data to the display even if the host wanted to send an entirely new full screen to the display. These controllers must send multiple partial screens of data to the display and wait for the display to process each one before a full screen is finally received. Although this method is efficient if the host wanted to send a small amount of data, it is inefficient if the host wanted to send a full screen of data.

It would be desirable for a controller to have the ability to operate like the first group of controllers when a full screen of data is being sent to the display, but operate like the second group of controllers when a partial screen of data is being sent to the display. Ideally, this controller could analyze the incoming data stream and determine if it contained a full screen of data or a partial screen of data. If it detected a full screen of data, the controller could switch to full screen mode. If it detected a partial screen of data, the controller could switch to partial screen mode.

SUMMARY OF THE INVENTION

It is the principal object of the invention to send data from a host computer to a device through a controller in an efficient manner.

It is another object of the invention to operate a workstation controller in either full screen mode or partial screen mode based on information contained in the incoming data stream.

It is another object of the invention to operate a workstation controller in full screen mode, large partial screen mode, or normal partial screen mode based on information contained in the incoming data stream.

These and other objects are accomplished by the suitably programmed workstation controller disclosed herein. The workstation controller operates in either full screen write mode or partial screen write mode. In one embodiment, the controller looks for a "Clear Display" (CD) command in the data stream from the host. If the data stream contains a CD command and if a screen image buffer is available, the controller operates in full screen write mode. Subsequent "Write to Device" (WTD) commands in the data stream are sent to the buffer, not to the device. When the controller detects the end of the data stream the entire contents of the buffer are sent to the display in one operation.

If the controller does not detect a CD command in the data stream, or if the CD command is detected but a screen image buffer is not available, the controller operates in partial screen write mode. WTD commands in the data stream are sent directly to the display one at a time.

In the preferred embodiment, the controller is capable of operating in three modes: full screen write mode, large partial screen write mode, and normal partial screen write mode. The controller operates in full screen write mode as discussed above. The controller operates in large partial screen write mode when a CD command is not detected, but the controller detects that the data stream is large, and a screen image buffer is available. In this mode, the controller must first read the data from the screen into the screen image buffer. Subsequent WTD commands in the data stream are sent to the buffer, not to the device. When the controller detects the end of the data stream the entire contents of the buffer are sent to the display.

If, in the preferred embodiment, the controller does not detect a CD command in the data stream and the data stream is not large, or if a screen image buffer is not available, the controller operates in normal partial screen write mode. WTD commands in the data stream are sent directly to the display one at a time.

BRIEF DESCRIPTION OF THE DRAWING

FIG. 1 shows a block diagram of the host computer, controller, and devices of the invention.

FIGS. 2A-2C show symbolic representations of data streams the host sends to the controller.

FIGS. 3-7 show a flowchart of the programmed controller of the preferred embodiment.

DESCRIPTION OF THE PREFERRED EMBODIMENT

Figure 4:
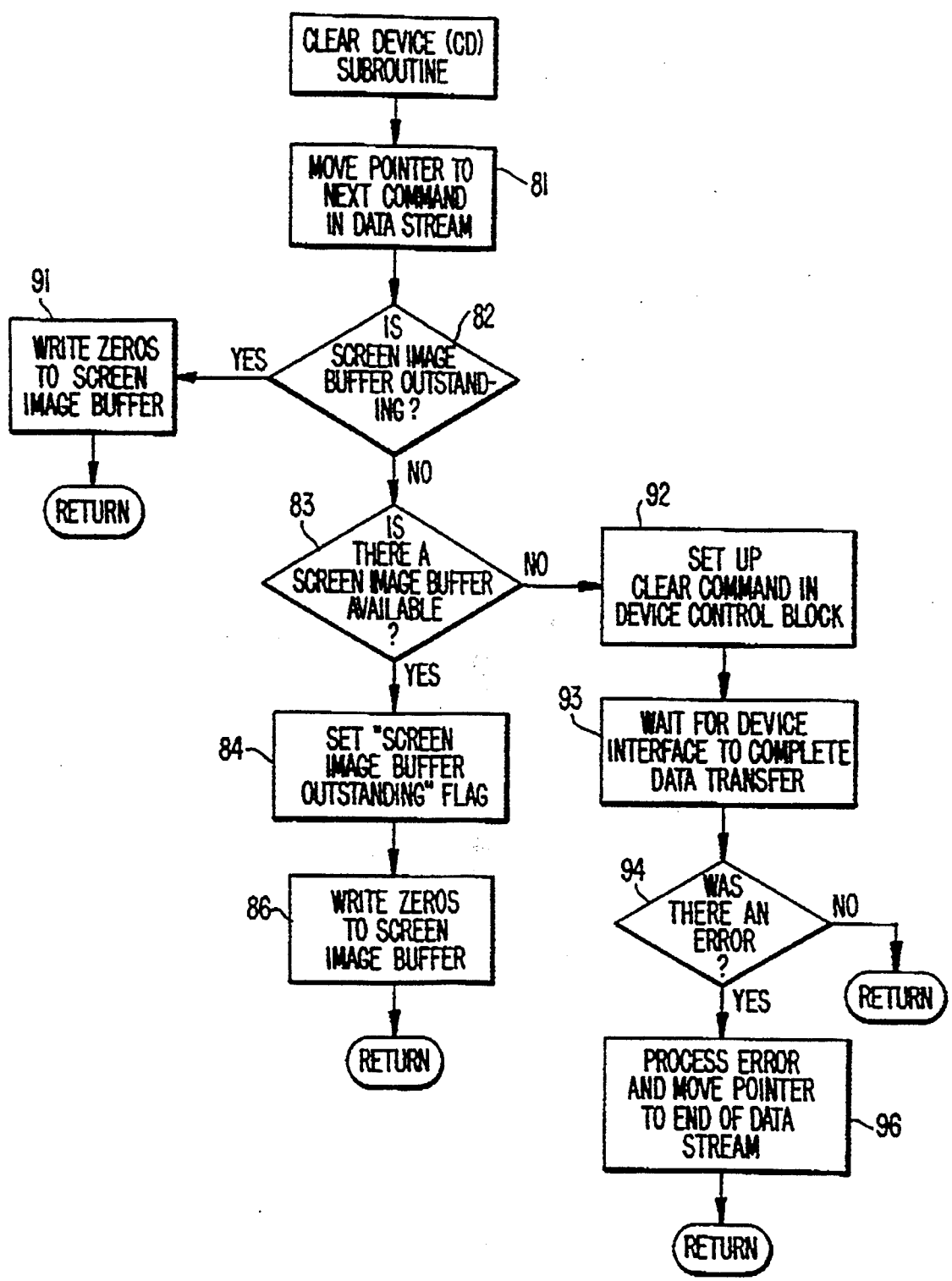

FIG. 1 shows an overall block diagram of the invention. Host 10 is connected to controller 20 which is connected to a group of devices 40. Host 10 can be any general purpose digital computer. Devices 40 are I/O devices and are usually displays, but could also be other devices such as printers, plotters, etc.

Controller 20 contains host interface 21, data stream processor 22, device interface 23, and storage 24. Storage 24 contains I/O buffers 26, screen image buffers 27, and device control blocks 28.

When host 10 wants to send data to a device, it sends a data stream to controller 20. Specifically, host interface 21 receives the data stream from host 10 and places the data stream in I/O buffer 26. Host interface 21 then tells data stream processor 22 the location of the data stream in I/O buffer 26 and the number of bytes contained in the data stream.

Host interface 21 also sends data streams to the host that have been placed in I/O buffer 26 by data stream processor 22. Host interface 21 communicates with host 10 via line 11, which can be a system bus, a communications line, part of a local area network, or other communications means.

Data stream processor 22, when notified by host interface 21 that a data stream has been placed in I/O buffer 26, processes the data stream in a manner to be discussed in more detail later in conjunction with FIGS. 3-7. Data stream processor 22 is typically a microprocessor suitably programmed to operate as discussed later in conjunction with FIGS. 3-7.

Data stream processor 22 processes the data stream and places commands in the device control block 28 corresponding to the intended device. Data stream processor 22 then notifies device interface 23 that there is information in device control block 28, and device interface 23 transfers data to/from the intended device based on the information contained in device control block 28. Device interface 23 informs data stream processor 22 when the data transfer has completed.

Device interface 23 is also able to poll for keystrokes and poll the device to determine when the device has completed processing a command.

FIGS. 2A-2C show symbolic representations of different data streams host 10 sends to controller 20. FIG. 2A shows a typical data stream. Header 51 is stripped off by host interface 21 and contains administrative information not pertinent to this invention. Typically, header 51 is part of a Systems Network Architecture (SNA) data stream well known to those skilled in the art. Device address 52 specifies the address of the device this data stream is intended for. Devices 41, 42, 43, etc, all have individual addresses known to host 10 and controller 20, and this address is specified in device address 52.

Clear Device (CD) 53 is a command commonly found in data streams intended to clear devices, usually displays. Normally, a CD command is sent to the display to null (erase) the display screen. If a CD command is present in a data stream, it normally begins the data stream, since a CD command in the middle of a data stream would erase everything that came before it in the data stream. The CD command could be named many different things depending on the architecture of the data stream, such as Clear Unit (CU), Erase Display (ED), Erase Device (ED), Null Unit (NU), etc. Therefore, CD will refer to any data stream command that is normally sent to clear a device.

Write to Device (WTD) 54 is a command commonly found in data streams intended to send data to devices, usually displays. Normally, a WTD command is sent to the display to write data to a portion of the display or to create, add, or modify the input fields or attributes associated with the display. The WTD command could be named many different things depending on the architecture of the data stream, such as Write to Display (WTD), Write Data (WD), Write to Unit (WTU), etc. Therefore, WTD will refer to any data stream command that is normally sent to write data to the device.

Note that the data streams in FIGS. 2A, 2B, and 2C are all slightly different. FIG. 2A starts out with a CD command and is followed by several WTD commands. FIG. 2B has no CD command and only a few WTD commands. FIG. 2C has no CD command and several WTD commands.

FIG. 2A is typical of a full screen write data stream. If the programmer is going to write a brand new full screen and is not merely updating a small portion of the screen, he/she wants to maintain screen integrity by knowing for sure that the screen is blank before starting to write a full screen of new data on it. The programmer can know this by starting off the data stream with a CD command. Therefore, the existence of a CD command in a data stream is a strong indication that a full screen of data is forthcoming. Note that full screen write data streams do not necessarily write data to every screen location—they merely clear the screen and write a new screen. The new "full screen of data" may contain few characters or many characters.

Note that the CD command in FIG. 2A is followed by at least one but usually several WTD commands that make up the full screen of data. Since there is a physical limit on the number of bytes that can be transferred in a WTD command, it usually takes several of them to make up a full screen of data.

FIG. 2B is typical of a partial screen write data stream. If the programmer is merely updating a small portion of the screen, he/she does not want or need to blank the entire screen first. At least one but usually a few WTD commands are sent to update the screen. Therefore, the absence of a CD command in a data stream is a strong indication that a partial screen of data is forthcoming.

FIG. 2C is also typical of a partial screen write data stream, but notice that a large number of WTD commands are strung together in this data stream. Here, although the programmer intended to only update the screen and not start with a new screen, he/she is updating most of the screen, and it may be more efficient to treat the data stream of FIG. 2C differently than the data stream of FIG. 2B. In the preferred embodiment, the data stream in FIG. 2B will be referred to as a normal partial screen write data stream, while the data stream of FIG. 2C will be referred to as a large partial screen write data stream.

Figure 5:
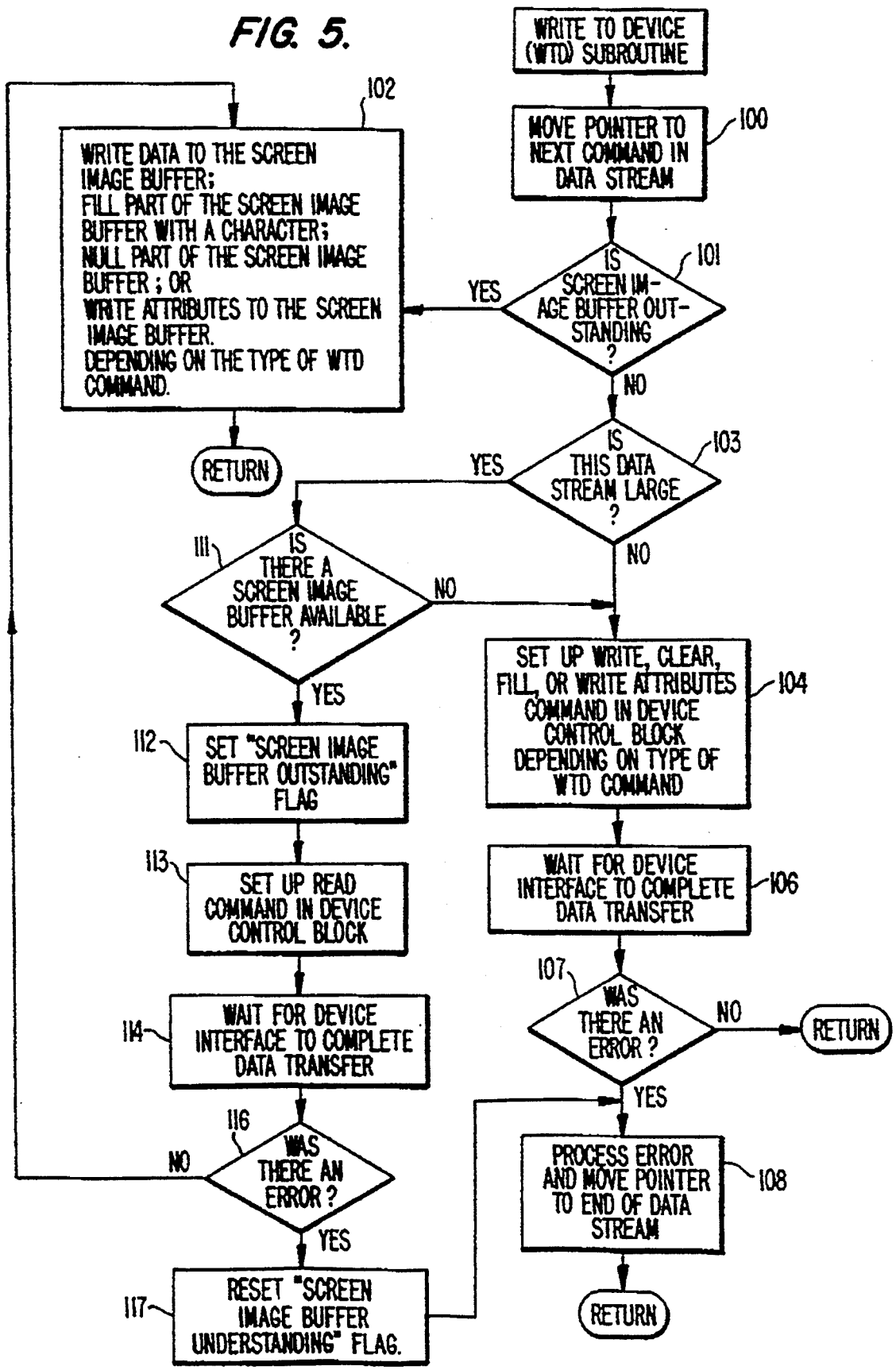
Figure 6:
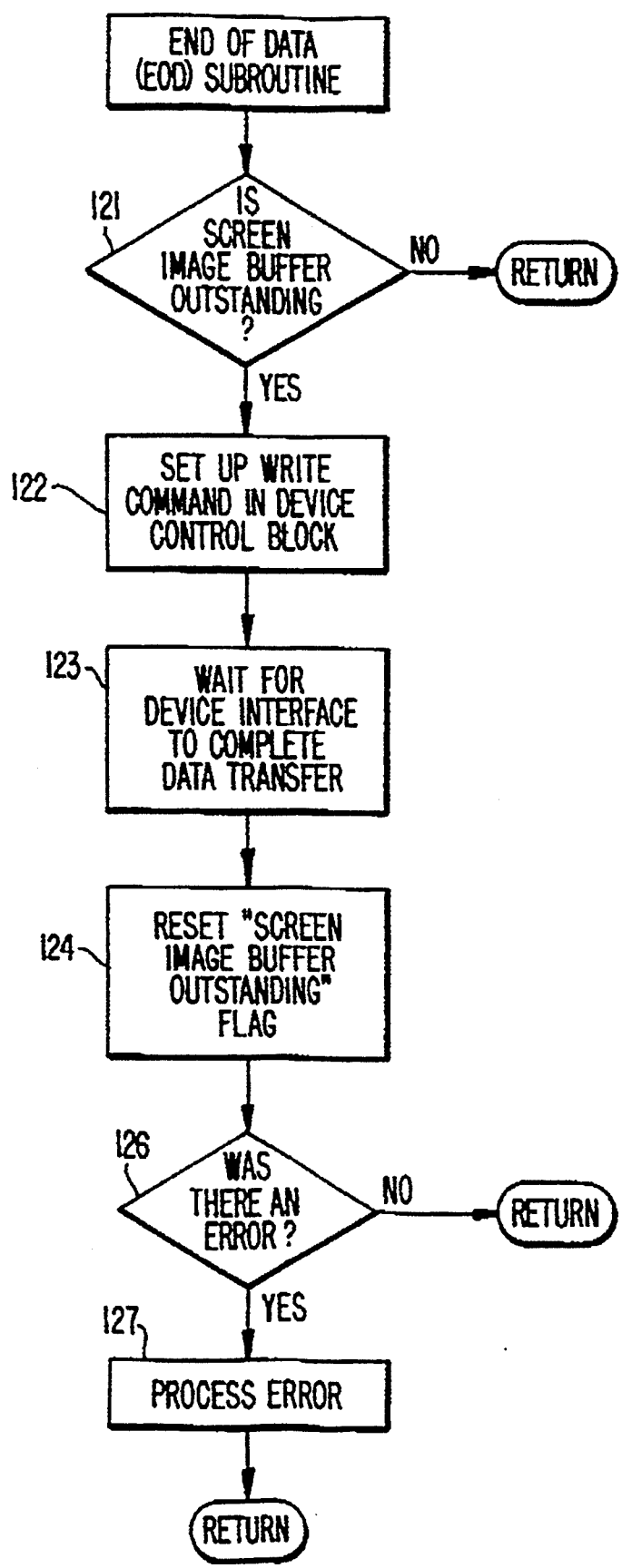

FIGS. 3-7 show a flowchart of how controller 20, and more specifically data stream processor 22, processes a data stream from host 10 such as those shown in FIGS. 2A-2C. When processor 22 is instructed by host interface 21 that a new data stream has been placed in I/O buffer 26, processor 22 reads the device address from the data stream and finds the corresponding device control block (DCB) 28, as shown in block 61 of FIG. 3. Processor 22 then looks to see if any data is left in the data stream to process in block 62. Block 62 performs this function by looking at the location of a data stream pointer which points to the next data stream command left to process. If the data stream pointer location is at the end of the data stream, the End of Data (EOD) subroutine shown in FIG. 6 is called (block 63).

If there is more data left in the data stream to process, processor 22 first looks to see if the next part of the data stream is a CD command (block 64). If so, the Clear Device (CD) subroutine shown in FIG. 4 is called (block 66).

If the next part of the data stream is not a CD command, processor 22 looks to see if it is a WTD command (block 67). If so, the Write to Device (WTD) subroutine shown in FIG. 5 is called (block 68).

Figure 7:
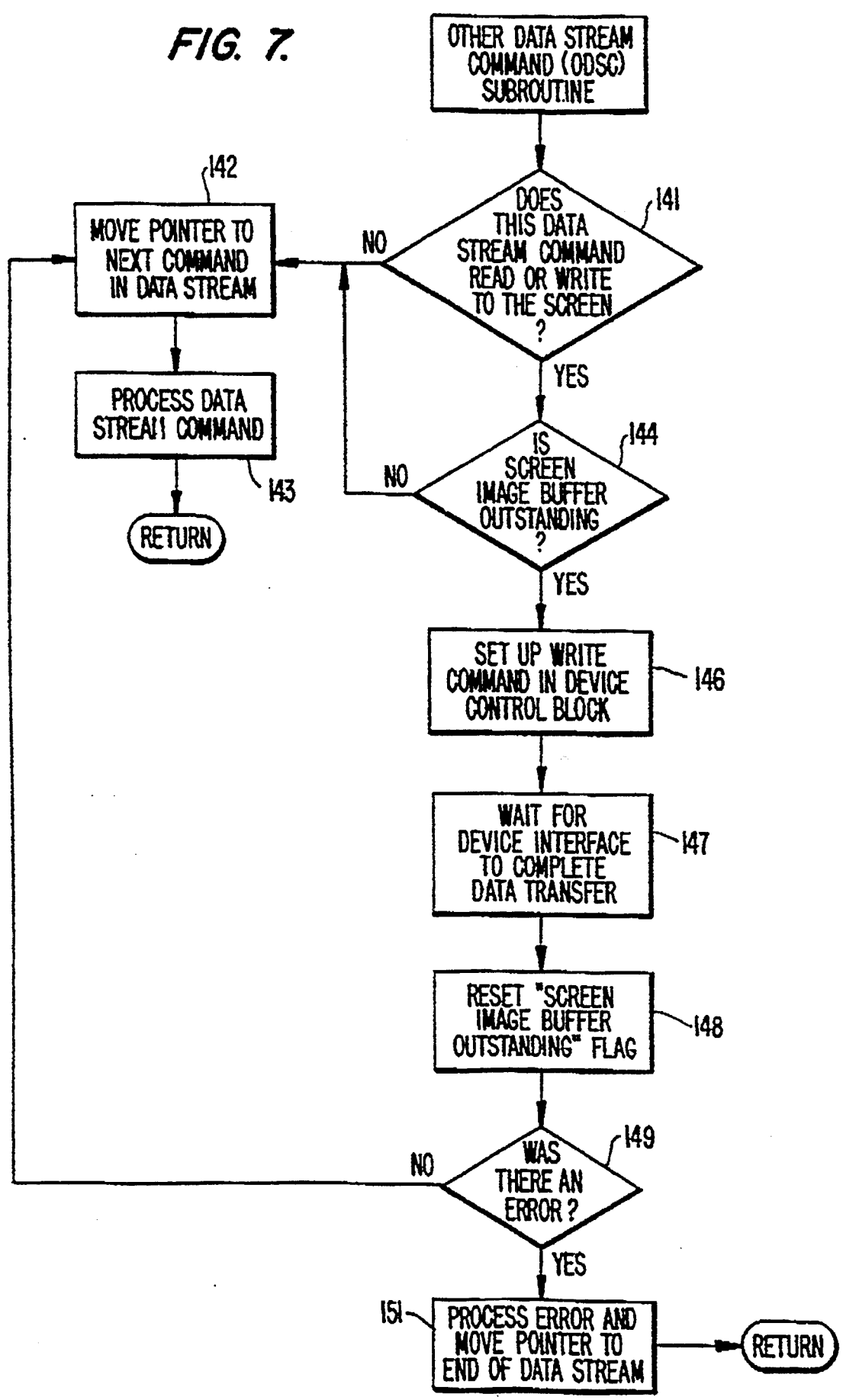

If the next part of the data stream was not a CD command or a WTD command, processor 22 looks to see if it is another valid data stream command (block 76). If so, the Other Data Stream Command (ODSC) Subroutine shown in FIG. 7 is called (block 77).

If the next part of the data stream was not a CD command, a WTD command, or another valid data stream command, the data stream is invalid and the host interface is informed of this fact (block 69). The data stream pointer is moved to the end of the data stream (block 71). Control loops back to block 62, and since no more data is in the data stream to process, EOD subroutine is called, as will be discussed later.

If a CD command is the next part of the data stream as determined in block 64, the CD subroutine shown in FIG. 4 is called. The data stream pointer is moved to the next command in the data stream so that block 62 of FIG. 3 can process the next command in the data stream when the subroutine completes the processing of this CD command and returns (block 81). Next, the subroutine looks to see if a screen image buffer 27 has already been created for this data stream (block 82). In the vast majority of cases, the answer is no and control moves on to block 83, where the subroutine queries whether a screen image buffer is available. In the preferred embodiment, there are fewer screen image buffers 27 (FIG. 1) than there are devices. This is done to conserve memory and to rely on the statistical likelihood that only a small number of devices will be written to during any one time interval. Note that screen image buffers can be used with devices that are not displays, such as printers, plotters, etc.

A screen image buffer 27 will be available the vast majority of the time, and the subroutine sets the Screen Image Buffer Outstanding flag in block 84. When this flag is set in block 84, controller 20 begins to operate in full screen write mode. Zeros are written to screen image buffer 27 to null it out (block 86). Note that the CD command nulls out a buffer, not the screen, when controller 20 is in full screen write mode. The subroutine then returns to block 62 of FIG. 3, where the next part of the data stream is processed.

Blocks 81, 82, 83, 84, and 86 in FIG. 4 describe the normal flow of operation of controller 20 in full screen write mode. The abnormal situations will now be discussed.

If block 82 indicates that a screen image buffer 27 is already outstanding when a CD command was received, this indicates that a CD command was found in the middle of a data stream. This can be architecturally legal but is nonsensical, since everything that preceded it is now lost. The subroutine writes zeros to screen image buffer 27, and the subroutine returns to block 62 of FIG. 3.

If block 83 indicates that a screen image buffer is not available because they are all being used by other devices (a statistically unlikely but possible situation) controller 20 is unable to go into full screen write mode. Instead, controller 20 goes into partial screen write mode and sets up a clear command in device control block (DCB) 28 (block 92). Device interface 23 is notified of the type of DCB command and sends the information on to the proper device, the screen of which is then cleared. The subroutine waits for device interface 23 to complete the transfer in block 93 (device interface 23 may be interleaving other tasks here as well). If there was an error in the transfer, the error is processed and the data stream pointer is moved to the end of the data stream (blocks 94 and 96). In either event, the subroutine returns to block 62 of FIG. 3.

Referring now to FIG. 5, the WTD subroutine is called if the next part of the data stream is detected by block 67 (FIG. 3) to be a WTD command. Note that a WTD command is capable of performing several different writing functions, such as writing data to the display, filling part of the display with a character, nulling part of the display, or writing attributes to the display. Parameters in the WTD command indicate which writing function is indicated.

The WTD subroutine first moves the pointer to the next command in the data stream so that block 62 of FIG. 3 can process the next command in the data stream when the subroutine completes processing this WTD command and returns (block 100). The subroutine then looks to see if a screen image buffer for this data stream is outstanding (block 101). If so, controller 20 is in either full screen write mode (flag was set in block 84 of FIG. 4) as previously discussed, or is in large partial screen write mode, which will be discussed later. In any event, the WTD command is processed by writing the indicated function to screen image buffer 27 (block 102). Note that the data is not sent on to the display at this time, but is instead written to screen image buffer 27. The subroutine returns to block 62 of FIG. 4 for processing the next part of the data screen.

If block 101 indicates that a screen image buffer is not outstanding, the subroutine looks to see if the data stream is large in block 103. In the normal situation, the data stream is not large and the subroutine moves on to block 104. When the subroutine is at block 104, controller 20 is operating in normal partial screen write mode. By getting to this point in the flow diagram, either a CD command was not in the data stream, or a CD command was in the data stream but a screen image buffer was not available. In addition, controller 20 is not in large partial screen write mode, for reasons that will be discussed later.

When controller 120 is in normal partial screen write mode, it sets up device control block 28 with the indicated write function from the WTD command. Device interface 23 then sends the information to the proper device, and it tells processor 22 when it completes the transfer in block 106. If there was an error in the transfer, the error is processed and the data stream pointer is moved to the end of the data stream (blocks 107 and 108). In either event, the subroutine returns to block 62 of FIG. 3.

The branch of the flowchart of FIG. 5 that puts controller 20 into large partial screen write mode will now be discussed. The subroutine looks to see if the data stream is large (block 103). This is determined by looking at the byte count of the data stream which was passed to data stream processor 22 by host interface 21 as discussed earlier. In the preferred embodiment, a threshold byte count (for example, 400 bytes) is selected that results in improved performance of controller 20.

In the preferred embodiment, the data stream of FIG. 2C would be considered large—the majority of the screen is being written to, but the programmer did not lead off the data stream with a CD command, and reprogramming the data stream to add in a CD command to take advantage of full screen write mode would be undesirable. Despite the fact controller 20 is not in full screen write mode, it would be desirable and efficient to reduce the number of data transfers to the device by storing this WTD command and succeeding WTD commands in the data stream in a screen image buffer. Therefore, if the threshold byte count is exceeded, the data stream is considered to be large and the subroutine looks to see if a screen image buffer is available (block 111).

If a screen image buffer is not available, large partial screen write mode cannot be entered, and the subroutine goes to block 104, where normal partial screen write mode is entered, as previously discussed. But if a screen image buffer is available, the Screen Image Buffer Outstanding flag is set (block 112), and controller 20 enters large partial screen write mode. The subroutine then sets up a DCB to read the screen of the device (block 113). This is desirable in the preferred embodiment since a CD was not performed and the present contents of the screen are unknown due to the fact that there are fewer screen image buffers than displays. Device interface 23 then sends the read request to the proper device, and it tells processor 22 when it completes the transfer in block 114 and the data from the screen is placed in the screen image buffer. If there was an error in the transfer, the error is processed, the Screen Image Buffer Outstanding flag is reset, the data stream pointer is moved to the end of the data stream, (blocks 116, 117 and 108), and the subroutine returns to block 62 of FIG. 3. If there was no error in the transfer, the WTD command is processed by writing the indicated function to screen image buffer 27 (block 102), and the subroutine returns to block 62 of FIG. 3.

Referring now to FIG. 7, the Other Data Stream Command (ODSC) Subroutine is called if the next part of the data stream is detected by block 76 (FIG. 3) to be a valid data stream command that is not a CD or a WTD command. The ODSC subroutine first looks to see if this data stream commands reads or writes anything to the screen (block 141). In most cases the answer is no, as the data stream command locks/unlocks the keyboard or performs various initialization functions. In this case, the data stream pointer is moved to the next command in the data stream (block 142) and the data stream function indicated by the present data stream command is performed (block 143). Control returns back to block 62 in FIG. 3.

If block 141 is answered positively (a rare event in the preferred embodiment), block 144 checks to see if a screen image buffer is outstanding. If not, the pointer is moved to the next command in the data stream (block 142) and the data stream function indicated by the present data stream command is performed (block 143). Control returns back to block 62 in FIG. 3.

If a screen image buffer is outstanding, the data contained in the screen image buffer is written to the device before this rare data stream command is processed. A write command is set up in the DCB (block 146), indicating to device interface 23 that the entire contents of the screen image buffer are to be transferred in one operation to the proper device. Device interface 23 sends the write data to the device, and it tells processor 22 when it completes the transfer in block 147. The Screen Image Buffer Outstanding Flag is reset in block 148, indicating that controller 20 is no longer in full screen write mode or large partial screen write mode. If there was an error in the transfer, the error is processed, the data stream pointer is set to the end of the data stream (block 151), and control returns to block 62 of FIG. 3. If there was not an error in the transfer, the data stream pointer is moved to the next command in the data stream (block 142) and the data stream function indicated by the present data stream command is performed (block 143). Control returns back to block 62 in FIG. 3.

When block 62 of FIG. 3 determines that the end of the data stream has been reached, the EOD subroutine of FIG. 6 is called. The EOD subroutine first looks to see if a screen image buffer for this data stream is outstanding (block 121). If not, processor 20 is in normal partial screen write mode (or the rare condition discussed in FIG. 7 has occurred) and all of the data in the data stream has already been sent to the display. Control returns to block 72 of FIG. 3.

If block 121 determines that a screen image buffer is outstanding, controller 20 is in either full screen write mode or large partial screen write mode, and all of the data from the WTD commands in the data stream has been stored in a screen image buffer but not sent to the display yet. A write command is set up in the DCB (block 122), indicating to device interface 23 that the entire contents of the screen image buffer (a full screen) are to be transferred in one operation to the proper device. Device interface 23 sends the write data to the device, and it tells processor 22 when it completes the transfer in block 123. The Screen Image Buffer Outstanding Flag is reset in block 124, indicating that controller 20 is no longer in full screen write mode or large partial screen write mode. If there was an error in the transfer, the error is processed. In either event, the subroutine returns to block 72 of FIG. 3.

Returning now to FIG. 3, block 72 looks to see if the data stream was processed correctly. Host 10 is informed of the status of the processing in blocks 73 and 74 via host interface 21. The data stream now processed, data stream processor 22 completes its function and waits for an indication from host interface 21 that another data stream has been placed in I/O buffer 26 that needs to be processed.

An example of how the preferred embodiment of the invention as shown in FIGS. 3–7 would process the data stream shown in FIG. 2A will now be discussed. After finding the DCB associated with device address 52 specified in the data stream, processor 22 looks at the first part of the data stream, CD 53, answers blocks 62 and 64 in the affirmative and calls the CD subroutine (FIG. 4). After moving the data stream pointer to the next command in the data stream and determining that a screen image buffer is not outstanding (blocks 81 and 82), processor 22 looks to see if a screen image buffer is available (block 83). Assuming one is available, the Screen Image Buffer Outstanding flag is set, and controller 20 enters full screen write mode (block 84). Zeros are written to the screen image buffer (block 86), and block 62 (FIG. 3) looks to the location of the data stream pointer to see if any more data is in the data stream to process. WTD 54 is the next part of the data stream to process, and processor 22 determines the answer to block 64 is no and block 67 is yes, and calls the WTD subroutine of FIG. 5. The data stream pointer is moved, and since a screen image buffer has been created for this data stream, block 101 is answered positively and the write function specified in the parameters of the WTD command is performed by writing the data to the screen image buffer. Control returns back to block 62 of FIG. 3, where the remaining WTD commands in the data stream are processed in the same manner. Once block 62 determines that the data stream pointer is pointing to the end of the data stream, the EOD subroutine of FIG. 6 is called. Since a screen image buffer is still outstanding (block 121), a write command is set up in the DCB (block 122), device interface 23 transfers the full screen of data to the display in one operation, and informs processor 22 when it completes (block 123). The Screen Image Buffer Outstanding flag is reset (block 124), taking processor 20 out of full screen write mode. After some error checking in FIGS. 6 and 3 (blocks 126, 127, 72, 73, 74) the data stream processing completes.

An example of how the preferred embodiment of the invention as shown in FIGS. 3-7 would process the data stream shown in FIG. 2B will now be discussed. After finding the DCB associated with device address 55 specified in the data stream, processor 22 looks at the first part of the data stream, WTD 56, answers block 62 yes, block 64 no, and block 67 yes and calls the WTD subroutine of FIG. 5. The data stream pointer is moved in block 100. Since a screen image buffer has not been created for this data stream, block 101 is answered negatively and block 103 asks whether this data stream is large. Since the data stream is less than the threshold byte count, the data stream is not large and controller 20 enters normal partial screen write mode. A write command is set up in the DCB (block 104), device interface 23 transfers the partial screen of data to the display, and informs processor 22 when it completes (block 106). Control returns back to block 62 of FIG. 3, where the remaining WTD commands in the data stream are processed in the same way. Once block 62 determines that the end of the data stream was reached, the EOD subroutine of FIG. 6 is called. Since a screen image buffer is not outstanding (block 121), the subroutine returns to block 72 of FIG. 3 and after some error checking, the data stream processing completes.

An example of how the preferred embodiment of the invention as shown in FIGS. 3-7 would process the data stream shown in FIG. 2C will now be discussed. After finding the DCB associated with device address 59 specified in the data stream, processor 22 looks at the first part of the data stream, WTD 57, answers block 62 yes, block 64 no, and block 67 yes and calls the WTD subroutine of FIG. 5. The data stream pointer is moved in block 100. Since a screen image buffer has not been created for this data stream, block 101 is answered negatively and block 103 asks whether this data stream is large. Since the data stream exceeds the threshold byte count, the data stream is large and, assuming a screen image buffer is available (block 111), the Screen Image Buffer Outstanding flag is set (block 112), indicating that controller 20 entered large partial screen write mode. A read screen command is set up in the DCB (block 113), and device interface 23 reads the screen and the information is placed in the screen image buffer. When device interface 23 completes the transfer, it informs processor 22 (block 114). After some error checking the write function of the WTD command is performed by writing the data to the screen image buffer (block 102). The subroutine returns back to block 62 of FIG. 3, where WTD 58 is processed. Processor 22 determines the answer to block 64 is no and block 67 is yes, and calls the WTD subroutine of FIG. 5. Since a screen image buffer has been created for this data stream, block 101 is answered positively and the write function of the WTD command is performed by writing the data to the screen image buffer. Control returns back to block 62 of FIG. 3, where the remaining WTD commands in the data stream are processed in the same way. Once block 62 determines that the end of the data stream was reached, the EOD subroutine of FIG. 6 is called. Since a screen image buffer is still outstanding (block 121), a write command is set up in the DCB (block 122), and device interface 123 transfers the full screen of data to the display in one operation and informs processor 22 when it completes (block 123). The Screen Image Buffer Outstanding flag is reset (block 124), taking processor 20 out of large partial screen write mode. After some error checking in FIGS. 6 and 3 (blocks 126, 127, 72, 73, 74) the data stream processing completes.

DESCRIPTION OF THE ALTERNATE EMBODIMENTS

While the preferred embodiment of the invention has now been described, several alternate embodiments have also been contemplated and fall within the spirit and scope of this invention.

In a first alternate embodiment, processor 20 operates in only two modes: full screen write mode and partial screen write mode. No provision is made to detect large data streams not preceded by a CD command. In this embodiment, block 103 of FIG. 5 does not exist, and the flow of control goes from block 101 directly to block 104. Blocks 111-114, 116 and 117 are not part of this embodiment. The normal partial screen write mode of the preferred embodiment becomes simply the partial screen write mode of this embodiment.

In a second alternate embodiment, there is one screen image buffer for each device connected to controller 20. Therefore, decision blocks 83 (FIG. 4) and 111 (FIG. 5) will always be answered yes, and the negative branches corresponding to these blocks are not part of this embodiment. In addition, blocks 113 & 114 will not be necessary in this embodiment, since the contents of the screen will be already stored in a screen image buffer and reading the screen is not necessary.

In a third alternate embodiment, controller 20 has two modes: large partial screen write mode and normal partial screen write mode. In this embodiment, CD commands either do not exist in the data stream architecture or are always processed as shown in blocks 92 and 93 of FIG. 4. The flow of the CD subroutine in this embodiment goes directly from block 81 to block 92, with blocks 82, 83, 84, 86, and 91 not being part of this embodiment.

In addition to these alternate embodiments, permutations and combinations of the above are possible and are also alternate embodiments. For example, the first and second alternate embodiments can be combined to show a processor 20 with a full screen write mode and a partial screen write mode, and one screen image buffer for each attached device. In this embodiment, the flow charts shown in FIGS. 3-7 would be modified as described in the first and second alternate embodiments.

While the invention has been described with respect to a preferred embodiment and several alternate embodiments thereof, it will be understood by those skilled in the art that various changes in detail may be made therein without departing from the spirit, scope, and teaching of the invention. Accordingly, the herein disclosed is to be limited only as specified in the following claims.

What is claimed is:

1. In a data processing system having a host computer, a controller, and a plurality of devices, a method of processing a data stream to efficiently send data to one of said plurality of devices comprising the steps of:

searching said data steam for a clear device command;

operating in full screen write mode upon detection of said clear device command in said data stream, said full screen write mode comprising the steps of:
 processing a write to device command in said data stream by sending the data contained in said write to device command to a screen image buffer in said controller;
 repeating said processing step until there is not more data in said data stream to process; and
 transferring the contents of said screen image buffer to said device; and operating in partial screen write mode of said clear device command is not detected.

2. The method of claim 1, wherein said partial screen write mode comprises the steps of:
 processing a write to device command in said data stream by sending the data contained in said write to device command to said device; and
 repeating said processing step until there is no more data in said data stream to process.

3. In a data processing system having a host computer, a controller, and a plurality of devices, a method of processing a data stream to efficiently send data to one of said plurality of devices comprising the steps of:
 searching said data stream for a clear device command;
 operating in full screen write mode upon detection of said clear device command in said data stream contingent on the availability of a screen image buffer in said controller;
 operating in partial screen mode if said clear device command is not detected; and
 operating in said partial screen write mode if said clear device command is detected but said screen image buffer is not available.

4. The method of claim 3, wherein said full screen write mode comprises the steps of:
 processing a write to device command in said data stream by sending the data contained in said write to device command to said screen image buffer;
 repeating said processing step until there is no more data in said data stream to process; and
 transferring the contents of said screen image buffer to said device.

5. The method of claim 3, wherein said partial screen write mode comprises the steps of:
 processing a write to device command in said data stream by sending the data contained in said write to device command to said device; and
 repeating said processing step until there is no more data in said data stream to process.

6. In a data processing system having a host computer, a controller, and a plurality of devices, a method of processing a data stream to efficiently send data to one of said plurality of devices comprising the steps of:
 searching said data stream for a clear device command;
 operating in full screen write mode upon detection of said clear device command in said data stream contingent on the availability of a screen image buffer in said controller;
 operating in a large partial screen write mode if said clear device command is not detected, said data stream exceeds a threshold byte count and said screen image buffer is available;

operating in normal partial screen write mode if said clear device command is not detected and said data stream does not exceed said threshold byte count, and;
 operating in said normal partial screen write mode if said screen image buffer is not available.

7. The method of claim 6, wherein said full screen write mode comprises the steps of:
 processing a write to device command in said data stream by sending the data contained in said write to device command to said screen image buffer;
 repeating said processing step until there is no more data in said data stream to process; and
 transferring the contents of said screen image buffer to said device.

8. The method of claim 6, wherein the normal partial screen write mode comprises the steps of:
 processing a write to device command in said data stream by sending the data contained in said write to device command to said device; and
 repeating said processing step until there is no more data in said data stream to process.

9. The method of claim 6, wherein said large partial screen write mode comprises the steps of:
 reading the contents from the screen of said device into said screen image buffer;
 processing a write to device command in said data stream by sending the data contained in said write to device command to said screen image buffer;
 repeating said processing step until there is no more data in said data stream to process; and
 transferring the contents of said screen image buffer to said device.

10. In a data processing system having a host computer, a controller, and a plurality of devices, a method of processing a data stream to efficiently send data to one of said plurality of devices comprising the steps of:
 searching said data stream for a clear device command;
 operating in full screen write mode upon detection of said clear device command in said data stream;
 operating in large partial device write mode if said clear device command in said data stream;
 operating in large partial device write mode if said clear device command is not detected and said data stream exceeds a threshold byte count; and
 operating in normal partial screen write mode if said clear unit command is not detected and said data stream does not exceed said threshold byte count.

11. The method of claim 10, wherein said full screen write mode comprises the steps of:
 processing a write to device command in said data stream by sending the data contained in said write to device command to a screen image buffer in said controller;
 repeating said processing step until there is no more data in said data stream to process; and
 transferring the contents of said screen image buffer to said device.

12. The method of claim 10, wherein said normal partial screen write mode comprises the steps of:
 processing a write to device command in said data stream by sending the data contained in said write to device command to said device; and
 repeating said processing step until there is no more data in said data stream to process.

13. The method of claim 10, wherein said large partial screen write mode comprises the steps of:

processing a write to device command in said data stream by sending the data contained in said write to device command to said screen image buffer;

repeating said processing step until there is no more data in said data stream to process; and transferring the contents of said screen image buffer to said device.

14. In a data processing system having a host computer, a controller, and a plurality of devices, a method of processing a data stream to efficiently send data to one of said plurality of devices comprising the steps of:

operating in large partial screen write mode if said data stream exceeds a threshold byte count; and operating in normal partial screen write mode if said data stream does not exceed said threshold byte count, said large partial screen write mode comprises the steps of:

processing a write to device command in said data stream by sending the data contained in said write to device command to a screen image buffer in said controller;

repeating said processing step until there is not more data in said data stream to process; and transferring the contents of said screen image buffer to said device.

15. The method of claim 14, wherein said normal partial screen write mode comprises the steps of:

processing a write to device command in said data stream by sending the data contained in said write to device command to said device; and repeating said processing step until there is no more data in said data stream to process.

16. In a data processing system having a host computer, a controller, and a plurality of devices a method of processing a data stream to efficiently send data to one of said plurality of devices comprising the steps of:

operating in large partial screen write mode if said data stream exceeds a threshold byte count and a screen image buffer is available;

operating in normal partial screen write mode if said data stream does not exceed said threshold byte count; and operating in normal partial screen write mode if said data stream is large but said screen image buffer is not available.

17. The method of claim 16, wherein said normal partial screen write mode comprises the steps of:

processing a write to device command in said data stream by sending the data contained in said write to device command to said device; and repeating said processing step until there is no more data in said data stream to process.

18. The method of claim 16, wherein said large partial screen write mode comprises the steps of:

reading the contents of said device into said screen image buffer;

processing a write to device command in said data stream by sending the data contained in said write to device command to said screen image buffer;

repeating said processing step until there is no more data in said data stream to process; and transferring the contents of said screen image buffer to said device.

19. A data processing system having a host computer, a controller, and a plurality of devices, said controller further comprising:

host interface means, connected to said host, for receiving a data stream from said host;

first storage means, connected to said host interface means, for storing said data stream;

data stream processing means, connected to said host interface means and said first storage means, for searching for a clear device command in said data stream, for operating in full screen write mode upon detection of said clear device command in said data stream and for operating in partial screen write mode if said clear device command is not detected;

second storage means connected to said data stream processing means, for storing data containing in a plurality of write to device commands in said data stream when said data stream processing means is operating in said full screen write mode; and device interface control means, connected to said data stream processing means, said first storage means and said second storage means, for sending a full screen of data from said second storage means to one of said plurality of devices when said data stream processing means is in said full screen write mode, and for sending a partial screen of data from said first storage means when said data stream processing means is in said partial screen write mode.

20. A data processing system having a host computer, a controller, and a plurality of devices, said controller further comprising:

host interface means, connected to said host, for receiving a data stream from said host;

first storage means, connected to said host interface means, for storing said data stream;

data stream processing means, connected to said host interface means and said first storage means, for searching for a clear device command in said data stream, for operating in full screen write mode upon detection of said clear device command in said data stream, for operating in large partial screen write mode if said clear device command is not detected and said data stream exceeds a threshold byte count, and for operating in normal partial screen write mode if said clear unit command is not detected and said data stream does not exceed a threshold byte count;

second storage means connected to said dat stream processing means, for storing data contained in a plurality of write to device commands in said data stream when said data stream processing means is operating in said full screen write mode or said large partial screen write mode; and device interface control means, connected to said data stream processing means, said first storage means and said second storage means, for sending a full screen of data from said second storage means to one of said plurality of devices when said data stream processing means is in said full screen write mode or said large partial screen write mode, and for sending a partial screen of data from said first storage means when said dat stream processing means is in said normal partial screen write mode.

* * * * *